Sept. 10, 1946.   J. J. KING   2,407,285
SEAL FOR RUNNING SHAFTS
Filed May 15, 1945
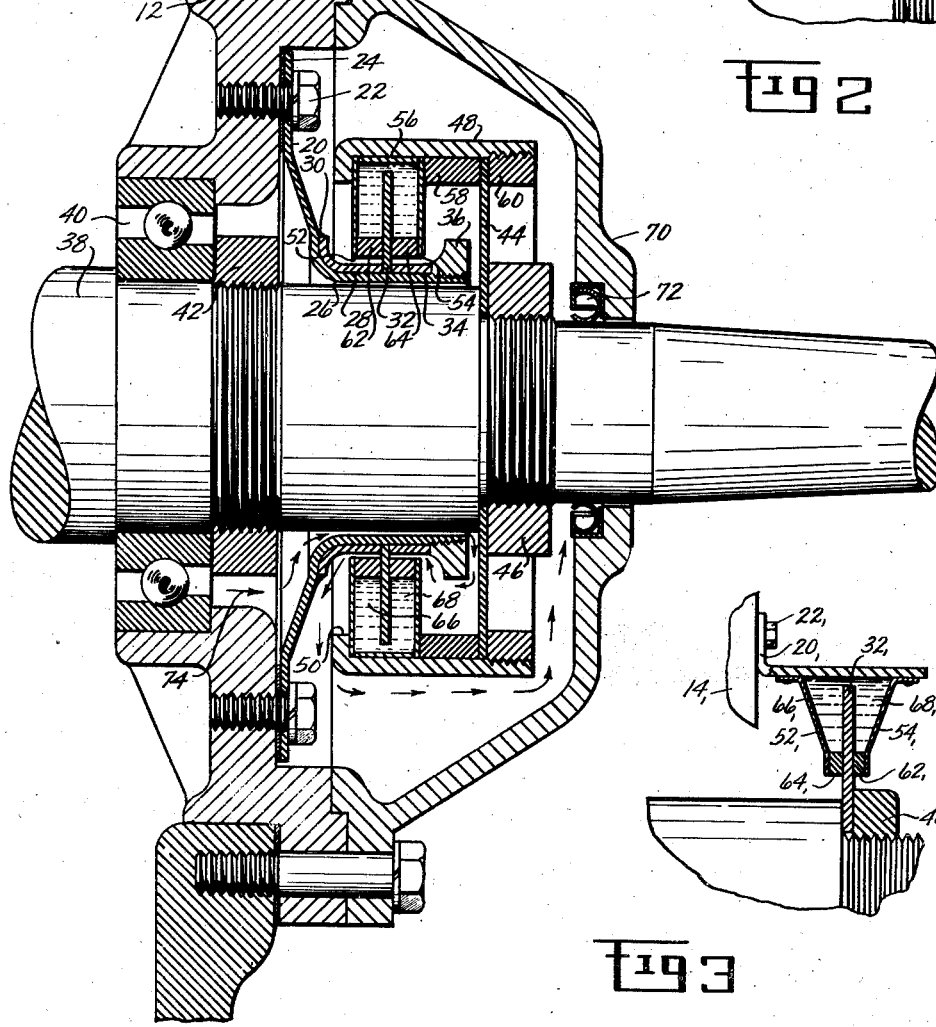
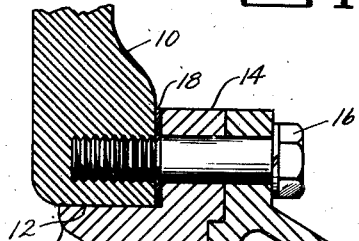
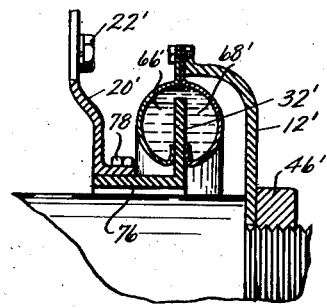
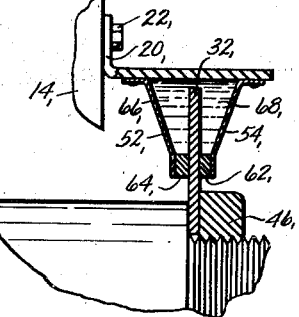
INVENTOR.
JESSE J. KING
BY
ATTORNEYS Patented Sept. 10, 1946

2,407,285

UNITED STATES PATENT OFFICE 2,407,285

SEAL FOR RUNNING SHAFTS

Jesse J. King, Dayton, Ohio

Application May 15, 1945, Serial No. 593,918

5 Claims. (Cl. 286—9)

(Granted under the act of March 3, 1883, as amended April 30, 1928; 370 O. G. 757)

The invention described herein may be manufactured and used by or for Government for governmental purposes, without the payment to me of any royalty thereon.

This invention relates to shaft seals particularly applicable where a rotatable shaft extends through a partition having a pressure differential on opposite sides thereof and is applicable to prevent leakage of fluid from either side of the partition to the other either while the shaft is rotating or after it has ceased rotation.

Seals for this purpose as heretofore known usually comprise rotating and nonrotating seal members held in frictional engagement under considerable pressure, whereby they not only wear rapidly but also consume considerable power.

It is therefore an object of this invention to provide a shaft seal wherein there are no friction rings in engagement with each other while the shaft is under rotation.

Another object is to provide a shaft seal wherein the relatively rotating parts of the device are in engagement with each other only through the medium of a liquid.

Another object is to utilize the centrifugal force of the sealing liquid when under rotation as a means of disengaging the friction rings which maintain the seal while the device is nonrotative.

Further objects will be apparent from a consideration of the following more detailed description reference being had to the accompanying drawing, wherein:

Fig. 1 is an axial section through a preferred form of my shaft seal as it may be arranged in a pump or compressor.

Fig. 2 shows a modified form of my invention applicable to the same situation as Fig. 1.

Fig. 3 shows a modification applicable where the shaft is stationary and the housing rotates.

Like reference characters refer to like parts throughout the several views.

Referring particularly to Fig. 1, a housing 10 is bored at 12 to receive the bearing head 14 which is held in the housing by screws 16, a gasket 18 being interposed between the bearing head and the housing to make a pressure tight joint therebetween.

A flange 20 is concentrically supported on the bearing head 14 and secured thereto by screws 22, a gasket 24 being provided to make a pressure tight joint. A tubular hub 26 extends axially from the flange 20. A reinforcing collar 28 on the hub 26 may be welded at 30. Collar 28 provides a shoulder for the annular plate 32 which is clamped between the end of the collar 28 and a ring 34 by the nut 36 which is threaded on to the end of the hub 26. The flange 20, hub 26, collar 28, plate 32, ring 34 and nut 36 comprise the nonrotatable portion of the seal.

The pump shaft 38 carries a bearing 40 which is concentrically supported in the bearing head 14, a nut 42 being provided for clamping the bearing to the shaft. A plate 44 is clamped against a shoulder on the shaft by a nut 46, whereby the plate and shaft rotate in unison.

A cylinder 48 closely surrounds the plate 44 and has an inturned flange 50 at one end. A pair of thin resilient discs 52 and 54 are spaced from each other by a spacing ring 56 and spaced from the plate 44 by a spacing ring 58, the discs 52 and 54, and the spacing rings 56 and 58 all being clamped between the flange 50 and the plate 44 by a nut 60 which is threaded into the end of the cylinder 48. Collars 62 and 64 are concentrically positioned with respect to the discs 52 and 54 and the plate 32 and may be secured either to the discs or to the plate, but preferably to the discs by soldering or similar means, whereby two chambers 66 and 68 are provided, the two chambers being connected by the clearance between the periphery of the plate 32 and the bore of the spacing ring 56.

The plate 44, nut 46, cylinder 48, discs 52 and 54, spacing rings 56 and 58, nut 60 and collars 62 and 64, constitute the rotatable portion of the seal. The joints between these parts should be pressure tight, and the chambers 66 and 68 substantially filled with a heavy fluid, preferably mercury. A cover 70 held on the bearing head 14 by the screws 16 keeps dirt and other foreign matter away from the seal. A seal ring 72 prevents dirt entering by way of the cover.

The operation of the seal is as follows:

When the device is in a state of rest as seen in the drawing, the collars 62 and 64 are pressed tightly against the sides of the annular plate 32 which maintains a seal against leakage in either direction. As soon, however, as rotation of the shaft 38 is up to a certain speed, the centrifugal force of the heavy fluid in the chambers 66 and 68 presses radially outward which causes the fluid to spread laterally and thus force the discs 52—54 and collars 62—64 apart, whereby the seal operates without friction.

Assume that the device has just been started and that fluid under system pressure from the housing 10 is entering the seal chamber as indicated by the arrows 74. The radially outward pressure of the heavy fluid in the chambers 66 and 68 due to centrifugal force is at first equal, but as the system pressure builds up it will be added to the centrifugal force in the chamber 68 but not in the chamber 66. If the chambers 66 and 68 have at the beginning been completely filled, a portion of the fluid which is in chamber 68 will move outward and over into the chamber 66 and force a like portion of that in the chamber 66 through into the space within the cover 70.

When full system pressure is established, the system pressure plus the centrifugal force of the fluid remaining in the chamber 68 will be equal to the centrifugal force of the fluid which completely fills the chamber 66 and a balance will have been reached.

It will, of course, be obvious that the correct amount of heavy fluid may be put into the chambers 66 and 68 originally and in that case none will be forced out in the first operation of the device.

In the modification shown in Fig. 2, the plate 32' has an integral hub 76 which may be secured to the flange 20' by screws 78. The annular enclosure which the plate 32' divides into compartments 66' and 68' is of circular cross section and made in halves of a thin spring stock. The support 12' for the annular enclosure is secured to the shaft by the nut 46'. Screws 22' are provided to fasten the flange 20' to the bearing head.

The modification Fig. 3 is adapted for use where the shaft or other inside member is nonrotative and the housing rotates as is sometimes the case. A bracket 20' is fastened by screws 22' to the bearing head. Bracket 20' carries the flexible side members 52' and 54' of the chambers 66' and 68' which in turn carry the rings 62' and 64'. A nut 46' secures the plate 32' to the shaft. Except that the housing rotates and the shaft is nonrotative, the operation of the embodiment of Fig. 3, is the same as described relative to Fig. 1.

Having described several embodiments of my invention, I claim:

1. In a device wherein a rotatable shaft extends through a partition and there is a pressure difference in the fluid on opposite sides of said partition, a shaft seal for preventing leakage of fluid along said shaft from one side of said partition to the other, said seal comprising an annular plate having a central opening loosely surrounding said shaft, means for holding said plate by its inner edge and nonrotatably supporting it on said partition, an annular enclosure having a central opening somewhat larger than the opening in said plate concentrically supported on said shaft to be rotated thereby and having the opening medially slotted to receive said plate, said plate extending outwardly to a point near the outer extremity of said enclosure and thereby dividing it into two compartments connected by a narrow passage at the outer edges, and a heavy fluid substantially filling the two compartments, the sides of said enclosure being resilient and tensioned to force the sides of said slot into frictional contact with said plate, whereby centrifugal force acting on the said heavy fluid will spread said slot and free said plate from frictional engagement therewith.

2. In a device wherein a rotatable shaft extends through a partition, and there is a pressure difference in the fluid on opposite sides of said partition, a shaft seal for preventing leakage of fluid along said shaft from one side of said partition to the other, said shaft seal comprising: a hollow annular enclosure of rectangular cross section, having an inner wall, an outer wall and two side walls, said enclosure concentrically surrounding said shaft at some distance therefrom, said enclosure having a circular slot extending through its inner wall intermediate its side walls, an annular plate concentrically surrounding said shaft and extending outwardly through said slot to a point near the outer wall of said enclosure thereby dividing said enclosure into two compartments connected by a narrow passage at their outer perimeter, means holding said enclosure at its outer perimeter for supporting said enclosure on said shaft for rotation therewith, means holding said plate at its inner perimeter for nonrotatably supporting said plate on said partition, and a heavy fluid substantially filling the two compartments, the side walls of said enclosure being thin and resilient and tensioned to force the sides of said slot into frictional contact with said plate whereby centrifugal force acting on the said heavy fluid will force said side walls apart and thereby spread said slot and free said plate from frictional engagement with the sides of said slot.

3. In a device which includes two members one of which is rotatable within the other, an improved seal for preventing the passage of matter through the space between the two members, said seal comprising a hollow annulus having outer, inner and side walls with a circular slot extending through its inner wall, an annular plate contained in said slot and extending outwardly through said slot to a point near the outer wall of said hollow annulus thereby dividing the space within said annulus into two compartments connected by a narrow passage at their outer perimeter, means supporting said enclosure on said rotatable member for rotation therewith, means supporting said plate on said nonrotatable member, and a heavy fluid substantially filling the two compartments, the side walls of said enclosure being resilient and tensioned to force the sides of said slot into frictional contact with said plate, whereby centrifugal force acting on the said heavy fluid will spread said side walls and thereby free said plate from frictional engagement with the sides of said slot.

4. A device wherein a rotatable shaft extends through a nonrotatable partition and there is a pressure difference in the fluid on opposite sides of said partition, a shaft seal for preventing leakage of fluid along said shaft from one side of said partition to the other, said seal comprising an annular plate having a central opening larger than said shaft, means for holding said plate at said central opening concentric with said shaft and for nonrotatably supporting it on said partition, a toric enclosure having its axial opening somewhat larger than the opening in said plate concentrically supported on said shaft to be rotated thereby and having the axial opening medially slotted to receive said plate, said plate extending outwardly to a point near the outer extremity of said enclosure and thereby dividing it into two compartments connected by a narrow passage at their outer edges, and a heavy fluid substantially filling the two compartments, the walls of said enclosure being resilient and tensioned to force the sides of said slot into frictional contact with said plate, whereby centrifugal force acting on said heavy fluid will spread said slot and free said plate from frictional engagement therewith.

5. In a device which includes a nonrotatable shaft and a rotatable member through which said shaft extends and wherein there is a pressure difference in the fluid on opposite sides of said rotatable member, a shaft seal for preventing leakage of fluid along said shaft from one side of said member to the other, said shaft seal comprising; a hollow annulus having outer, inner and side walls with a circular slot extending through its inner wall, an annular plate contained in said slot and extending outwardly through said slot to a point near the outer wall of said hollow annulus thereby dividing the space within said annulus into two compartments connected by a narrow passage at their outer perimeter, means supporting said enclosure on said rotatable member, means supporting said plate on said nonrotatable shaft, and a heavy fluid substantially filling the two compartments, the side walls of said enclosure being resilient and tensioned to force the sides of said slot into frictional contact with said plate, whereby centrifugal force acting on said heavy fluid will spread said side walls and thereby free said plate from frictional engagement with the sides of said slot.

JESSE J. KING.